Figure 1:
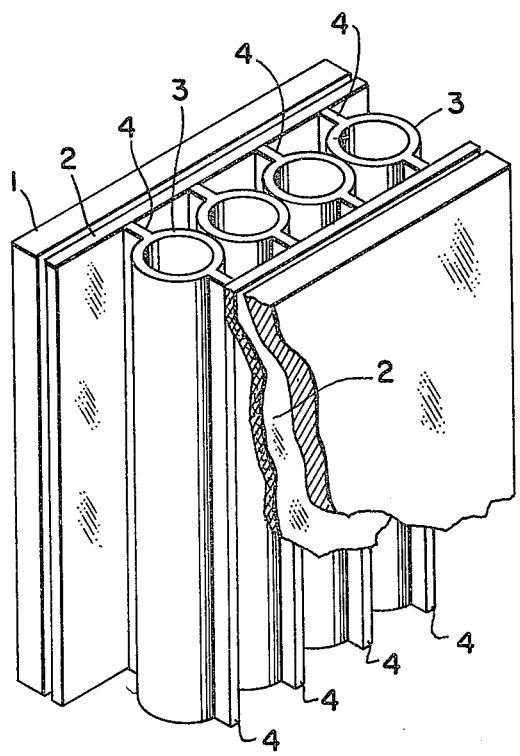

United States Patent [19]
Breidenbach

[11] 3,950,186
[45] Apr. 13, 1976

[54] ENVELOPE FOR THE TUBULAR ELECTRODES OF STORAGE BATTERIES

[75] Inventor: Heinz Breidenbach, Renningen, Germany

[73] Assignee: Varta Batterie Aktiengesellshaft, Hannover, Germany

[22] Filed: July 8, 1974

[21] Appl. No.: 486,419

[30] Foreign Application Priority Data
July 23, 1973  Germany............................ 2337320

[52] U.S. Cl. ..................... 136/54; 136/63; 136/147
[51] Int. Cl.² ......................................... H01M 35/04
[58] Field of Search .......... 136/43, 54, 55, 63, 147, 136/148, 131, 132, 26, 27; 156/148, 187, 191

[56] References Cited
UNITED STATES PATENTS

| | | |
|---|---|---|
| 1,243,371 | 10/1917 | Willard .............................. 136/147 |
| 2,195,211 | 3/1940 | Hall ...................................... 136/55 |
| 2,350,752 | 6/1944 | Graf...................................... 136/55 |
| 3,081,368 | 3/1963 | Wunsche .............................. 136/43 |
| 3,224,905 | 12/1965 | Hentschel ............................ 136/55 |
| 3,266,935 | 8/1966 | Boriolo ................................. 136/43 |

Primary Examiner—Anthony Skapars
Attorney, Agent, or Firm—Weiser, Stapler & Spivak

[57] ABSTRACT

Spacers for fabric electrode tubes are made by tying-off groups of warp threads of the fabric with weft threads of the same fabric. This forms ears which protrude beyond the fabric tube diameter.

12 Claims, 2 Drawing Figures

U.S. Patent   April 13, 1976   3,950,186

ENVELOPE FOR THE TUBULAR ELECTRODES OF STORAGE BATTERIES

The invention relates to an envelope for tubular electrodes such as may be used in lead acid storage batteries.

Envelopes for such tubular electrodes, made in general of woven plastic fabric or glass fibers, are known in a wide variety of specific forms. For example, in German Patent publication (Auslegeschrift) No. 1,162,895 it is proposed to utilize for this purpose mixed materials of plastic and glass fibers.

Such tubular electrode envelopes are generally produced from double layer fabric. This consists of a woven fabric forming flat pockets which intersect at regular intervals. This fabric is slack after weaving, and is stiffened through introduction of cylindrical cores, as well as through heating and the shrinking of the plastic fibers which may ensue.

For example, according to German Patent publication (Auslegeschrift) No. 1,197,521, such a fabric may be heated until the plastic fibers soften, whereupon the softened fibers adhere to each other and their porosity simultaneously decreases. In other known processes, the slack fabric is impregnated with a synthetic resin dispersion and then stiffened by insertion of cylindrical cores and drying.

In addition to envelopes formed of double-layer pockets, individual tubes, especially of glass fibers, may be utilized, which are then assembled into a tubular electrode plate.

Between the positive tubular electrode and the negative electrode a spacer must be provided within the battery in order to obtain better electrolyte diffusion and better gas elimination during charging. Customarily, such a spacer consists of a perforated polyvinyl chloride separator serving as spacer adjacent the positive electrode and of a separator adjacent the negative electrode which may be a sintered body, or, if desired of rubber, of woven material or of matting.

This type of separating arrangement is very expensive and entails high manufacturing costs because of the large number of steps required for its assembly. In addition the use of multiple separators which this requires causes an increase in electrical resistance.

Accordingly, it is an object of the invention to provide an envelope for tubular electrodes suitable for lead acid storage batteries which reduces the requirement for expensive spacers and which exhibits lower resistance.

This and other objects which will appear are achieved in accordance with the invention by making the individual tubes of a hose-like woven fabric. Two oppositely positioned spacers extending beyond the diameter of the tubes are formed by tying a plurality of warp threads together by means of weft threads.

The production of such an electrode pocket may take place as follows. First, a hose-like fabric is woven in which, depending upon the desired size of the spacers, several warp threads are so tied-off by weft threads that a hose-like fabric with two ears is produced. The shaping can then be performed in the usual manner by insertion of cores followed by impregnation and drying, or by impregnation before insertion of the cores. It is also possible to impregnate the threads prior to weaving and then to accomplish shaping by heat setting. The ears, or spacers so formed are preferably simultaneously impregnated with a material resistant to the electrolyte, such as polymethacrylate, polystyrene or similar synthetic resins.

A specific embodiment of the invention involves making those warp threads which are to be tied off, and which are to serve as spacers, of a different material than that used for the remainder of the hose-like fabric. For example, thermo-plastic fibers may be used for this purpose, such as polyethylene and polypropylene. In that case, the ears can then be stabilized by heat treatment followed by cooling.

To eliminate entirely an impregnation process from the manufacture of these tubes, it is also possible to additionally provide the hose-like fabric, which is then preferably made of glass fibers, with an internal supporting fabric of a thermoplastic material. In that case, the shaping can be accomplished by heat setting. The supporting web and the warp threads to be tied off may be made of the same material, such as polyethylene or polypropylene.

The use of a supporting fabric with subsequent heat setting is proposed in U.S. Pat. application Ser. No. 328,291, filed Jan. 31, 1973.

For further details, reference is made to the accompanying drawing wherein

Figure 2:
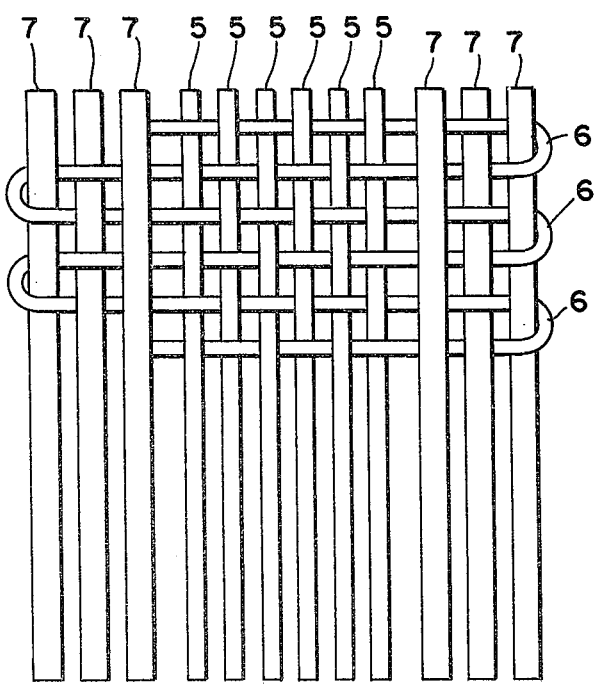

FIG. 1 is a diagrammatic view of a tubular electrode plate with individual tubes provided with spacers embodying the invention; and FIG. 2 is a diagrammatic view of the construction of the woven fabric utilized in the embodiment of FIG. 1.

Referring to FIG. 1, the electrode plate comprises a negative electrode 1 and separators 2 between which there are positioned the individual tubes 3 with spacers 4 which form the positive electrode.

Referring to FIG. 2, this shows a woven fabric of hose-like form, including warp threads 5 and weft threads 6. These threads preferably consist of glass fibers because these exhibit the best durability under the conditions prevailing in storage batteries. The warp threads which are to be tied off to form the spacer are designated by reference numeral 7. The hose-like fabric may be made in any of a variety of weaves, including linen, twill and satin weaves. For glass fibers, it is preferred to use twill or satin weaves.

For tube diameters of 8mm, for example, the spacer may protrude beyond the diameter of the tubes by between 1 and 2mm approximately.

The tube envelope according to the invention makes it possible to eliminate the conventional spacer. This saves much expense and also considerably lowers the resistance (150 to 250m $\Omega \times cm^2$). In addition the acid volume within the cell is increased leading to better mass utilization. The resistance of conventional electrode pockets, polyvinyl chloride corrugated spacer, and separator amounts for prime mover batteries to 500 to 600 m $\Omega \times cm^2$.

I claim:

1. An envelope for the tubular electrodes of a lead acid storage battery comprising a plurality of spaced-apart fabric tubes, and characterized in that each tube comprises groups of warp threads tied off by weft threads forming a plurality of spacers protruding beyond the diameter of the tube.

2. An envelope according to claim 1, wherein said tied-off thread groups are diametrically opposite each other around the periphery of said tube.

3. An envelope according to claim 1, wherein said tied-off warp threads are of different thickness than the remaining warp threads.

4. An envelope according to claim 1, characterized in that the fabric comprises glass fibers, and the tied-off warp threads comprise thermoplastic fibers.

5. An envelope according to claim 1, characterized in that the fabric consists of glass fibers and is provided with an internal supporting frame of plastic fibers.

6. An envelope according to claim 1, characterized in that the tied-off warp threads are stiffened by impregnated synthetic resin.

7. An envelope according to claim 1, wherein both said tube and said tied-off thread groups are impregnated with a material resistant to battery electrolyte.

8. A spacer arrangement for providing spacing between different electrodes in a lead acid storage battery, one electrode comprising fabric tubes positioned side by side, said arrangement comprising fabric ears protruding from said fabric tubes toward a different electrode, said ears comprising groups of warp threads of said fabric tied-off by weft threads thereof.

9. The arrangement of claim 8, wherein said ears space said tubes from electrode plates positioned on opposite sides of said tubes.

10. The arrangement of claim 9, wherein said ears are stiffened by impregnated synthetic resin.

11. The arrangement of claim 1 wherein the tied-off groups are so positioned on the periphery of each tube as to provide spacers protruding laterally with respect to the plane defined by the tubular electrodes.

12. The arrangement of claim 11 wherein the spacers protrude at right angles to the plane.

* * * * *